UNITED STATES PATENT OFFICE.

OTTOKAR SERPEK, OF PARIS, FRANCE, ASSIGNOR TO SOCIETE GENERALE DES NITRURES, OF PARIS, FRANCE.

PROCESS FOR THE MANUFACTURE OF AMMONIA BY MEANS OF ALUMINIUM NITRID.

1,040,439. Specification of Letters Patent. Patented Oct. 8, 1912.

No Drawing. Application filed May 14, 1912. Serial No. 697,255.

*To all whom it may concern:*

Be it known that I, OTTOKAR SERPEK, of 12 Rue Roquepine, Paris, France, chemical engineer, have invented a certain new and useful Process for the Manufacture of Ammonia by Means of Aluminium Nitrid, of which the following is a full, clear, and exact description.

Nitrid of aluminium is a body fairly resistant to water. At ordinary temperatures it decomposes in water giving off ammonia in a manner hardly perceptible and it is only in boiling water that the evolution of ammonia begins to become appreciable; but even under pressure and consequently at temperatures higher than 100° C., it requires a fairly long time to obtain a considerable yield of ammonia.

It has already been proposed to obtain ammonia by means of aluminium nitrid by decomposing the latter by solutions of alkaline aluminate. This being so, the present invention is based upon the following observation, viz. that it is possible to work with solutions of aluminate in which the content of alkali is less than that which is necessary to render soluble the alumina resulting from the decomposition of the aluminium nitrid treated. Consequently it is also possible to employ over again as they are, the weak alkaline lyes resulting from the preceding operations, so as to be able to suppress in this way the losses of alkalis and the expense necessitated by the concentration of the weak lyes.

This process can be applied to all nitrids which can be decomposed by alkalis and of which the decomposition yields saline solutions in a dissociated state, for instance to the decomposition of nitrogenous compounds by solutions of alkaline silicates.

Example: 100 kilograms of aluminium nitrid with a content of 28 per cent. of nitrogen (that is to say a nitrogenous product containing 82 per cent. of aluminium nitrid) are introduced into 200 kilograms of a solution of aluminate which contains 20 per cent. of potassium hydrate. The whole is brought to boiling point with continual stirring. Ammonia is given off in a strong and regular manner. After boiling there remains precipitated alumina which contains practically no nitrogen. It is preferable to effect the boiling under pressure. Theoretically the quantity of nitrid above would have necessitated about 100 kilograms of alkali. In practice, 40 kilograms of potassium hydrate has been sufficient, which moreover has not been employed in the free state but in the form of a salt (aluminate). After the complete decomposition and the separation of the solution of precipitated alumina and if necessary after dilution of the latter with water up to 200 kilograms, this solution can serve again to decompose 100 kilograms of nitrid, etc. In the same way the alumina separated from the solution can be treated so as to re-form nitrid.

Speaking generally, if I add small quantities, as for example, even merely traces, of alkalis, to an aqueous solution in the presence of aluminium nitrid, the decomposition of the latter is made in a complete manner, as if with water alone but much more rapidly. The alkali, whether free or in the form of aluminate, attacks the nitrid with disengagement of $NH_3$ and precipitation of $Al_2O_3$ coming from the nitrid decomposed. In short, traces of alkali suffice to provoke complete and rapid decomposition of large quantities of aluminium nitrid.

I claim as my invention:—

As an improvement in the process of producing ammonia, subjecting aluminium nitrid to the action of a solution of aluminate of which the content in alkali is less than that which is necessary to render soluble the alumina resulting from the decomposition of the aluminium nitrid treated.

In testimony whereof I have signed my name to this specification, in the presence of two subscribing witnesses.

OTTOKAR SERPEK.

Witnesses:
H. C. COXE,
LEON PEILLET.